United States Patent
Stoll et al.

(10) Patent No.: US 6,655,491 B1
(45) Date of Patent: Dec. 2, 2003

(54) POWER STEERING APPARATUS

(75) Inventors: Richard A. Stoll, Royal Oak, MI (US); Rogerio De Moura Maradini, Sao Bernardo Do Campo (BR)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/592,456

(22) Filed: Jun. 9, 2000

(51) Int. Cl.$^7$ ............................................. F16C 37/098
(52) U.S. Cl. ...................... 180/417; 285/308; 285/921; 285/319
(58) Field of Search ................. 285/319, 308, 285/921; 180/417

(56) References Cited

U.S. PATENT DOCUMENTS

| | | | |
|---|---|---|---|
| 3,826,523 A | * 7/1974 | Eschbaugh | 285/921 |
| 4,223,922 A | * 9/1980 | Pape | 285/921 |
| 4,276,812 A | 7/1981 | Dymond | |
| 4,289,335 A | 9/1981 | Olbermann | |
| 4,756,558 A | * 7/1988 | Beamer | 285/319 |
| 4,826,486 A | 5/1989 | Palsrok et al. | |
| 4,844,515 A | * 7/1989 | Field | 285/921 |
| 4,938,510 A | 7/1990 | Gmeiner et al. | |
| 5,046,765 A | 9/1991 | Usui | |
| 5,161,834 A | * 11/1992 | Norkey | 285/319 |
| 5,271,476 A | 12/1993 | Minamibata | |
| 5,374,084 A | * 12/1994 | Potokar | 285/319 |
| 5,505,276 A | 4/1996 | Luibrand | |
| 5,542,717 A | * 8/1996 | Rea et al. | 285/319 |
| 5,593,188 A | * 1/1997 | McNaughton et al. | 285/319 |
| 5,730,481 A | 3/1998 | Szabo et al. | |
| 5,732,984 A | * 3/1998 | Bartholomew | 285/319 |
| 5,964,484 A | * 10/1999 | Bartholomew | 285/319 |
| 5,988,706 A | * 11/1999 | Hollnagel | 285/319 |
| 5,992,903 A | * 11/1999 | Bartholomew | 285/319 |
| 6,086,118 A | * 7/2000 | McNaughton et al. | 285/308 |
| 6,176,342 B1 | * 1/2001 | Luibrand et al. | |
| 6,267,416 B1 | * 7/2001 | Ferreira et al. | 285/319 |

* cited by examiner

Primary Examiner—Brian L. Johnson
Assistant Examiner—Christopher Bottorff
(74) Attorney, Agent, or Firm—Tarolli, Sundheim, Covell & Tummino L.L.P.

(57) ABSTRACT

A power steering apparatus (10) includes a housing (22) defining a chamber (25) for holding power steering fluid. The housing (22) has an opening (62, 104, 154) defined by a projection (64, 102, 152) integrally formed on the housing. A conduit (50) extends into the opening (62, 104, 154) and is connected with the projection (64, 102, 152) on the housing (22). A connector assembly (60, 100, 150) connects the conduit (50) with the projection (64, 102, 152) on the housing (22). The connector assembly (60, 100, 150) includes a clip (68, 108, 158) having a base (78, 118, 168) with an opening (82, 126, 176) and a plurality of resilient fingers (80, 122, 170) extending from the base. Either the conduit (50) or the projection (64, 102, 152) extends through the opening (82, 126, 176) in the base (78, 118, 168) and engages the base. The fingers (80, 122, 170) engage the other of the conduit (50) and the projection (64, 102, 152).

8 Claims, 2 Drawing Sheets

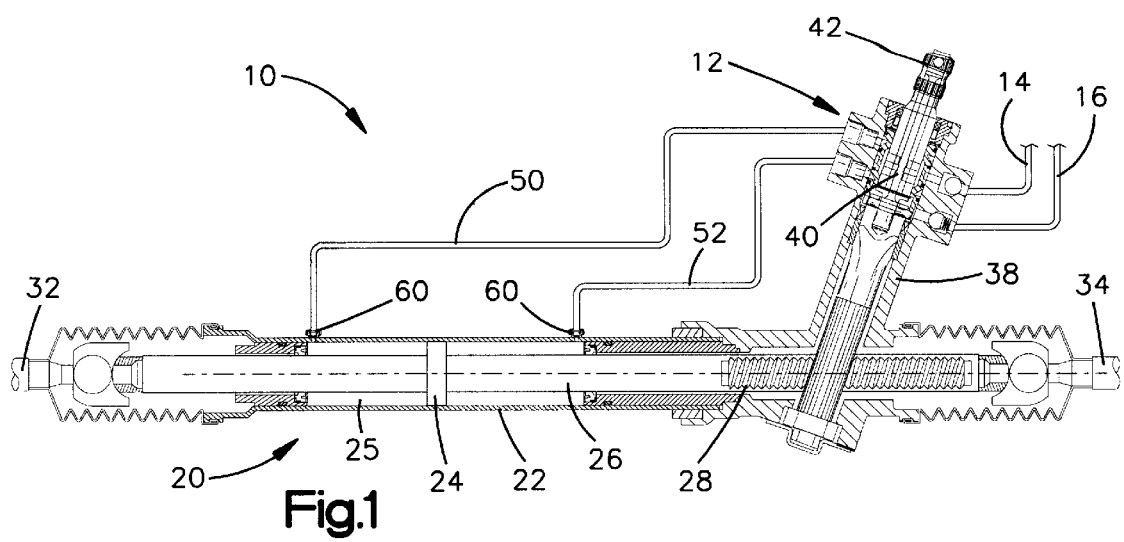
Fig.1
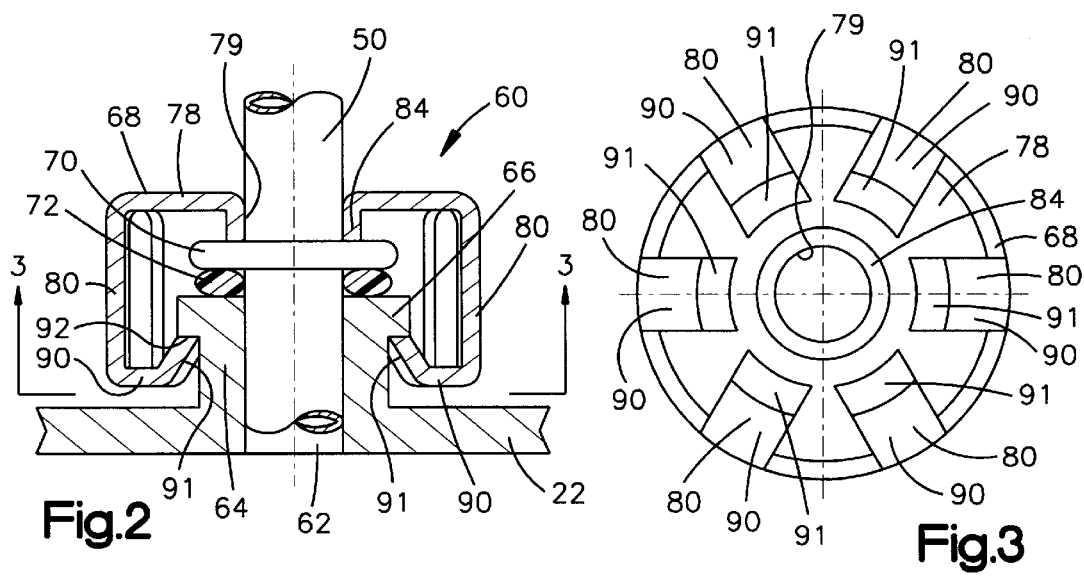
Fig.2
Fig.3
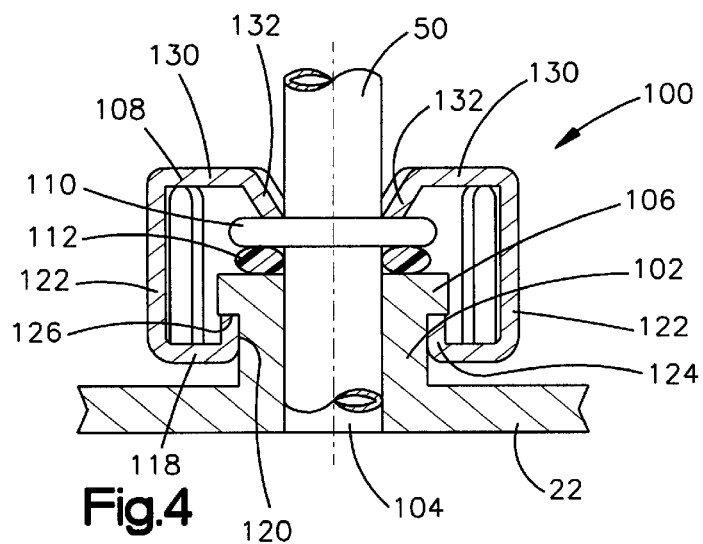
Fig.4

POWER STEERING APPARATUS

FIELD OF THE INVENTION

The present invention relates to a power steering apparatus, and more specifically to a power steering apparatus having a connector assembly which connects a conduit with a housing having a chamber which holds power steering fluid.

BACKGROUND OF THE INVENTION

A known power steering apparatus includes a hydraulic motor having a housing which encloses a chamber. Power steering fluid under pressure is conducted through a conduit to the chamber during turning of steerable vehicle wheels in one direction. Power steering fluid is conducted from the chamber through the conduit during turning of steerable vehicle wheels in the opposite direction. It is desirable to be able to quickly and securely interconnect the conduit and the housing.

A known connection between a conduit for conducting power steering fluid and a housing includes a base fixedly connected with the housing. The base is welded to the housing to connect the base to the housing. A clip engages the base and the conduit to hold the conduit against movement relative to the housing.

SUMMARY OF THE INVENTION

A power steering apparatus of the present invention includes a housing defining a chamber for holding power steering fluid. The housing has an opening defined by a projection integrally formed on the housing. A conduit extends into the opening and is connected with the projection on the housing. A connector assembly connects the conduit with the projection on the housing. The connector assembly includes a clip having a base with an opening and a plurality of resilient fingers extending from the base. The conduit or the projection extends through the opening in the base and engages the base. The fingers engage the other of the conduit and the projection.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic illustration of a portion of a power steering apparatus;

FIG. 2 is an enlarged fragmentary sectional view of a first embodiment of a connector assembly of the present invention connecting a conduit with a housing in the power steering apparatus of FIG. 1;

FIG. 3 is a schematic illustration of a clip of the connector assembly taken along the line 3—3 of FIG. 2;

FIG. 4 is an enlarged fragmentary sectional view of a second embodiment of a connector assembly connecting a conduit with a housing in a power steering apparatus;

DESCRIPTION OF THE INVENTION

Figure 5:
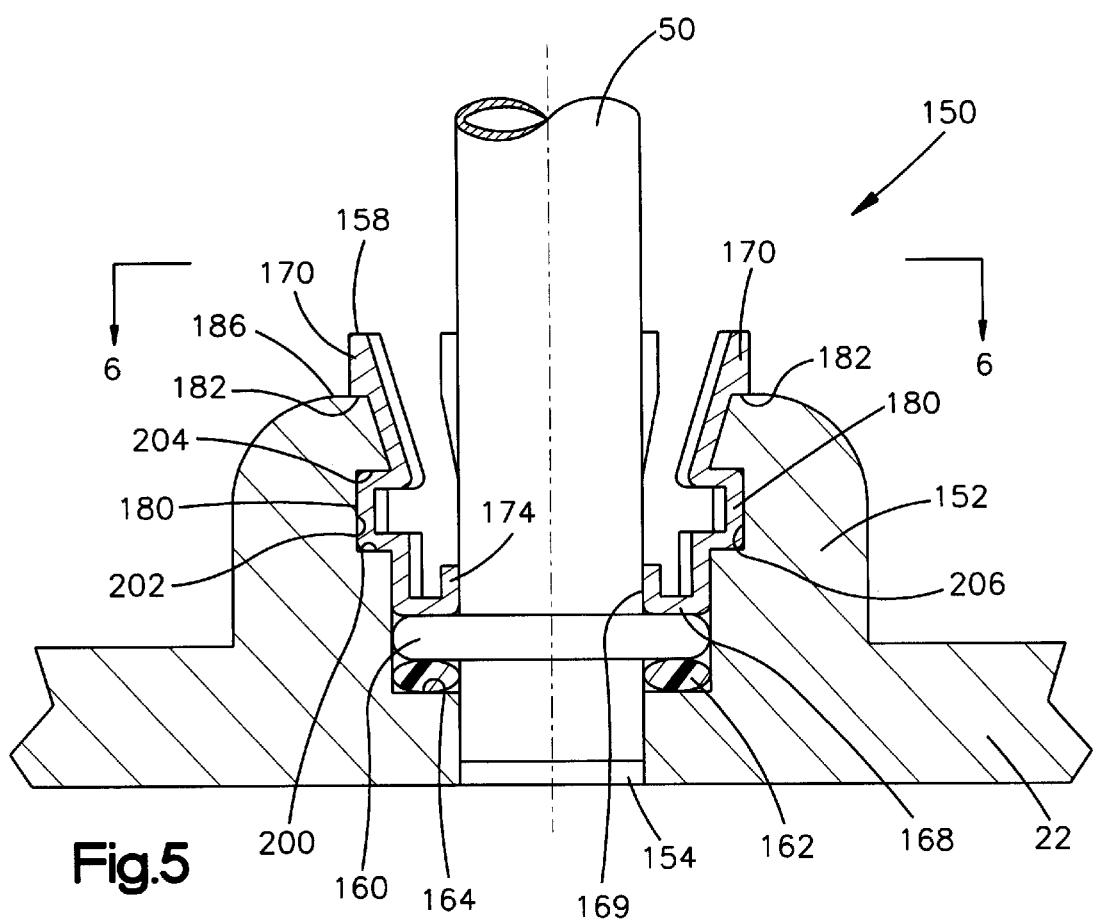
FIG. 5 is an enlarged fragmentary sectional view of a third embodiment of a connector assembly connecting a conduit with a housing in a power steering apparatus.

A vehicle power steering apparatus 10 (FIG. 1) includes a power steering valve 12 which is connected with the outlet of a power steering pump (not shown) by a conduit 14. A second conduit 16 connects the power steering valve 12 with a reservoir for the pump.

The power steering valve 12 controls the flow of fluid to and from a power steering motor 20. Although the power steering motor 20 could have many different constructions, in the illustrated embodiment of the invention, the power steering motor includes a cylindrical housing 22 which encloses a piston 24. The piston 24 is disposed in a chamber 25 in the housing 22. The piston 24 is connected with a rack bar 26 on which rack teeth 28 are disposed. Opposite ends of the rack bar 26 are connected with steerable vehicle wheels, in a known manner, by tie rods 32 and 34.

The power steering valve 12 includes a valve housing 38 which encloses a rotatable valve core 40. An input end portion 42 of the valve core 40 is connected with a vehicle steering wheel. Upon rotation of the vehicle steering wheel, the power steering valve 12 is operable to connect either a conduit 50 or a conduit 52 in fluid communication with the outlet from the power steering pump through the conduit 14. The other one of the conduits 50 and 52 is connected with the reservoir through the conduit 16.

The general construction and mode of operation of the power steering apparatus 10 is well known. It is contemplated that the power steering apparatus 10 may have a construction and mode of operation which is generally similar to the construction and mode of operation of the power steering apparatus disclosed in U.S. Pat. Nos. 5,505,276 and 4,276,812.

Connector assemblies 60 (FIGS. 1 and 2) are provided to connect the conduits 50 and 52 with the housing 22. The connector assemblies 60 are identical and therefore, only the connector assembly connecting the conduit 50 with the housing 22 will be described in detail. The housing 22 has an opening 62 (FIG. 2) defined by a projection 64 integrally formed on the housing 22. The projection 64 is formed on the housing 22 by punching the opening 62 in the housing from the inside of the housing outward. The projection 64 is then struck from the outside, while the housing 22 is supported from the inside, causing the top edge of the projection to roll over and form a radially extending lip 66.

The connector assembly 60 includes a clip 68 engaging the projection 64 and a radially extending bead 70 on the conduit 50. The clip 68 presses the bead 70 on the conduit 50 against an annular seal 72 to seal a joint between the projection 64 and the conduit 50. The seal 72 is pressed between the projection 64 and the bead 70.

The clip 68 (FIGS. 2 and 3) includes a base 78 with an opening 79 through which the conduit 50 extends. A plurality of resilient fingers 80 extend from the base 78. FIG. 3 shows six fingers 80 extending from the base 78, however, two or more fingers could extend from the base. An axially extending cylindrical flange 84 (FIGS. 2 and 3) of the base 78 defines the opening 79. The flange 84 engages the bead 70 on the conduit 50 to press the conduit into the opening 62 in the housing 22.

Each of the fingers 80 includes a radially inwardly extending portion 90. An end 91 of each of the fingers 80 extends radially inwardly and axially from the portion 90. The ends 91 of the fingers 80 engage a radially outwardly extending surface 92 (FIG. 2) on the lip 66 of the projection 64.

During construction of the power steering apparatus 10, the projection 64 is integrally formed on the housing 22 by punching the opening 62 in the housing 22. The projection 64 is rolled over to form the lip 66.

The clip 68 is placed on the conduit 50 with the conduit extending through the opening 79 in the base 68. The radially extending bead 70 is then formed on the conduit 50 to retain the clip 68 on the conduit 50. The seal 72 is then placed on the conduit 50 in engagement with the bead 70. The clip 68 is then slid along the conduit 50 until the flange 84 engages the bead 70.

The conduit 50 is moved into the opening 62 in the projection 64. The clip 68 and conduit 50 are moved downward, as viewed in FIG. 2, so that the ends 91 of the fingers 80 engage the lip 66 to cause the fingers to move radially outward. The clip 68 and the conduit 50 move further downward until the fingers 80 snap into engagement with the surface 92 on the lip 66 to prevent movement of the conduit relative to the housing 22.

A second embodiment of a connector assembly for connecting the conduit 50 to the housing 22 of the power steering apparatus 10 is illustrated in FIG. 4. A connector assembly 100 is provided to connect the conduit 50 with a projection 102 on the housing 22. The projection 102 is formed by punching an opening 104 in housing 22 from inside the housing outward. The projection 102 is struck from the outside to cause the top edge of the projection to roll over and form a lip 106.

The connector assembly 100 includes a clip 108 engaging the projection 102 and a radially extending bead 110 formed on the conduit 50. The clip 108 is generally similar to the clip 68 illustrated in FIGS. 2 and 3. The clip 108 presses the bead 110 on the conduit 50 against an annular seal 112 to seal a joint between the projection 102 on the housing and the conduit 50. The seal 112 is pressed between the projection 102 and the bead 110.

The clip 108 includes a base 118 with an opening 120 through which the projection 102 extends. A plurality of resilient fingers 122 extend from the base 118. It is contemplated that six fingers 122 extend from the base; 118, however, two or more fingers 122 could extend from the base 118. An axially extending cylindrical flange 124 of the base 118 defines the opening 120 in the base 118. The flange 124 engages a radially extending surface 126 of the lip 106 to connect the clip 108 to the projection 102.

Each of the resilient fingers 122 includes a radially inwardly extending portion 130. An end 132 of each of the fingers 122 extends radially inwardly and axially from the portion 130. The ends 132 of the fingers 122 engage the bead 110 on the conduit 50.

During construction of the power steering apparatus 10, the projection 102 is integrally formed on the housing 22 by punching the opening 104 in the housing. The clip 108 is then placed on the projection 102 with th e projection extending through the opening 120. An end of the projection 102 is struck from the outside to cause the end to roll over to form the lip 106 which retains the clip 108 on the housing 22.

The bead 110 is formed on the conduit 50. The seal 112 is placed on the conduit 50 and into engagement with the bead 110. The conduit 50 is moved downward, as viewed in FIG. 4, until the seal 112 engages the ends 132 of the resilient fingers 122. The resilient fingers 122 move radially outward upon engagement with the seal 112. The conduit 50 moves downward into the opening 104. When the bead 110 moves axially past the ends 132 of the fingers 122, the resilient fingers snap into engagement with the bead 110 to press the seal 112 between the bead and the projection 102 and prevent movement of the conduit relative to the housing.

Figure 6:
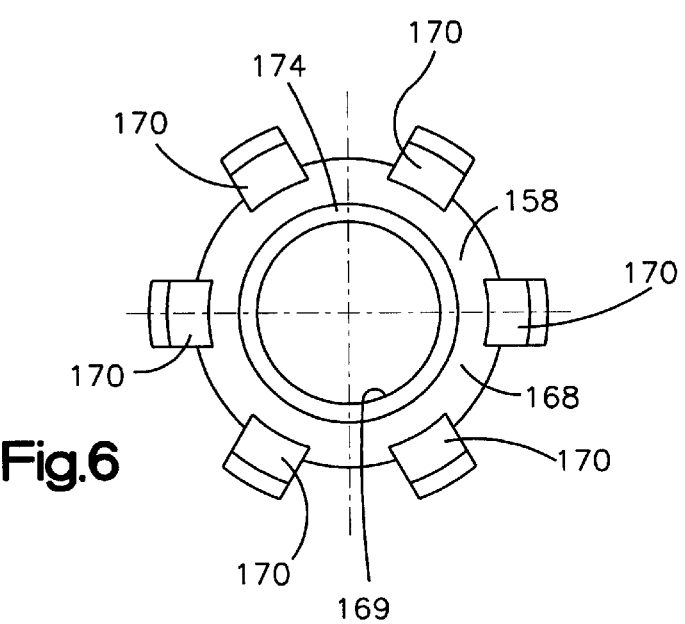
FIG. 6 is a schematic illustration of a clip of the connector assembly taken along the line 6—6 in FIG. 5.

A third embodiment of a connector assembly for connecting the conduit 50 to the housing 22 of the power steering apparatus 10 is illustrated in FIGS. 5 and 6. A connector assembly 150 is provided to connect the conduit 50 with a projection 152 (FIG. 5) integrally formed on the housing 22. The projection 152 is formed by punching an opening 154 in the housing 22 from the inside of the housing outward.

The connector assembly 150 includes a clip 158 engaging a radially extending bead 160 on the conduit 50 and the projection 152. The clip 158 presses the bead 160 on the conduit 50 against an annular seal 162 to seal a joint between the conduit 50 and the projection 152. The seal 162 is pressed between the bead 160 and a radially extending surface 164 on the projection 152.

The clip 158 (FIGS. 5 and 6) includes a base 168 with an opening 169 through which the conduit 50 extends. A plurality of resilient fingers 170 extend from the base 168. FIG. 6 shows six fingers 170 extending from the base 168, however, two or more fingers could extend from the base. An axially extending cylindrical flange 174 of the base 168 defines the opening 169 in the base. The flange 174 engages the conduit 50.

Each of the fingers 170 (FIG. 5) includes a radially extending portion 180. Each of the fingers 170 has a radially extending surface 182. The surface 182 engages an axial end surface 186 of the projection 152 to retain the clip 158 in the opening 154.

The projection 152 (FIG. 5) includes a radially extending annular surface 200 axially spaced from the surface 164. An axially extending cylindrical surface 202 extends perpendicular to the surface 200. A radially extending annular surface 204 extends perpendicular to the cylindrical surface 202 and parallel to the surface 200. The surfaces 200, 202, and 204 define an annular recess 206 in the projection 152. The annular recess 206 receives the portions 180 on the fingers 170 to retain the conduit 50 in the opening 154.

During construction of the power steering apparatus 10, the projection 152 is integrally formed on the housing 22 by punching the opening 154 in the housing. The radially extending surface 164 and the annular recess 206 are formed on the projection 152.

The clip 158 is placed on the conduit 50 with the conduit extending through the opening 169 in the base 168. The bead 160 is formed on the conduit 50 to retain the clip 158 on the conduit. The seal 162 is placed on the conduit 50 in engagement with the bead 160. The conduit 50 is then moved downward, as viewed in FIG. 5, into the opening 154 until the seal 162 engages the surface 164.

The clip 158 is then moved downward, as viewed in FIG. 5, into the opening 154 in the projection 152 until the base 168 engages the bead 160. As the clip 158 moves downward, the portions 180 on the fingers 170 engage the surface 186 on the projection 152 to cause the fingers 170 to move radially inward. Upon further movement downward, the portions 180 of the resilient fingers 170 snap into the recess 206 in the projection 152 to connect the conduit 50 with the projection 152.

From the above description of the invention, those skilled in the art will perceive improvements, changes and modifications. Such improvements, changes and modifications within the skill of the art are intended to be covered by the appended claims.

Having described the invention, the following is claimed:

1. A power steering apparatus comprising:

a housing defining a chamber for holding power steering fluid, said housing having an opening defined by a projection formed on said housing, said projection including a lip with a radially extending lower surface;

a conduit extending into said opening, said conduit including a bead that extends radially outwardly of said conduit, said bead including opposite first and second side surfaces;

a connector assembly connecting said conduit with said projection on said housing, said connector assembly including a clip having a base with an opening, said conduit extending through said opening in said base and a portion of said base engaging said first side surface of said bead of said conduit, said clip further including a plurality of resilient fingers that extends axially from said base and beyond said second side surface of said bead of said conduit, said fingers including portions for snapping over said lip of said projection on said housing and engaging said radially extending lower surface of said lip for connecting said conduit with said projection; and an annular seal interposed between said projection on said housing and said second side surface of said bead of said conduit, said second side surface of said bead and said projection contacting opposite surface portions of said annular seal, said clip being, dimensioned so that, when said portion of said base of said clip engages said first side surface of said bead of said conduit and said portions of said fingers of said clip engage said radially extending lower surface of said lip of said projection, said annular seal is axially compressed by said bead and said projection and all of said lip of said projection, said bead of said conduit, and said annular seal are interposed between said portion of, said base and said portions of said fingers of said clip.

2. A power steering apparatus as defined in claim 1 wherein said portion of said base of-said clip includes an axially extending flange, said flange defining said opening in said base.

3. A power steering apparatus as defined in claim 1 wherein each finger of said fingers of said clip includes a tapered portion which, when pressed axially against the projection on said housing, biases said finger radially outwardly for enabling said finger to snap over said lip of said projection.

4. A power steering apparatus as defined in claim 1 wherein said opening in said base of said clip has a diameter that is greater than a diameter of said conduit and is less than a diameter of said bead, said portions of said fingers collectively defining an end opening of said clip, said end opening having a diameter that is greater than the diameter of said conduit and is less than the diameter of said bead.

5. A power steering apparatus comprising:

a housing defining a chamber for holding power steering fluid, said housing having an opening defined by a projection formed on said housing, said projection including a lip with a radially extending lower surface and an upper surface;

a conduit extending into said opening, said conduit including a bead that extends radially outwardly of said conduit, said bead including opposite first and second side surfaces;

a connector assembly connecting said conduit with said projection on said housing, said connector assembly including a clip having a base with an opening, said projection extending through said opening in said base and a portion of said base engaging said radial extending lower surface of said lip of said projection, said clip further including a plurality of resilient fingers that extends axially from said base and beyond said upper surface of said lip of said projection, said fingers including portions for snapping over said bead of said conduit and engaging said first side surface of said bead for connecting said conduit with said projection; and an annular seal interposed between said projection on said housing and said second side surface of said bead of said conduit, said second side surface of said bead and said projection contacting opposite surface portions of said annular seal, said clip being dimensioned so that, when said portion of said base of said clip engages said radially extending lower surface of said lip of said projection and said portions of said fingers of said clip engage said first side surface of said bead of said conduit, said annular seal is axially compressed by said bead and said projection and all of said lip of said projection, said bead of said conduit, and said annular seal are interposed between said portion of said base and said portions of said fingers of said clip.

6. A power steering-apparatus as defined in claim 5 wherein said portion of said base of said clip includes an axially extending flange, said flange defining said opening in said base.

7. A power steering apparatus as defined in claim 5 wherein each finger of said fingers of said clip includes a tapered portion which biases said finger radially outwardly when pressed axially against said bead of said conduit for enabling said finger to snap over said bead of said conduit.

8. A power steering apparatus as defined in claim 5 wherein said opening in said base of said clip has a diameter that is greater than a diameter of said projection and is less than a diameter of said lip of said projection, said portions of said fingers collectively defining an end opening of said clip, said end opening having a diameter that is less than the diameter of said lip of said projection.

\* \* \* \* \*